United States Patent [19]
Morita et al.

[11] Patent Number: 5,297,861
[45] Date of Patent: Mar. 29, 1994

[54] REAR WHEEL BRAKING FORCE CONTROL APPARATUS AND CONTROL METHOD THEREFOR

[75] Inventors: Takao Morita, Toyota; Tsutomu Matsukawa, Okazaki; Hiromichi Yasunaga, Okazaki; Tadao Tanaka, Okazaki, all of Japan

[73] Assignee: Mitsubishi Jidosha Kogyo Kabushiki Kaisha, Tokyo, Japan

[21] Appl. No.: 36,542

[22] Filed: Mar. 22, 1993

[30] Foreign Application Priority Data

Mar. 30, 1992 [JP] Japan .................................. 4-073648
Apr. 20, 1992 [JP] Japan .................................. 4-099621
Apr. 21, 1992 [JP] Japan .................................. 4-101400

[51] Int. Cl.$^5$ .............................................. B60T 8/18
[52] U.S. Cl. .................................. 303/113.5; 188/349; 303/100; 303/9.75; 303/119.1; 303/DIG. 3
[58] Field of Search ............... 303/113.5, 111, 119.1, 303/100, 92, 9.62, 9.63, 9.71, 9.75, 103, 113.1, DIG. 2, DIG. 3, DIG. 4; 188/349, 181 A, 181 R

[56] References Cited

U.S. PATENT DOCUMENTS

| | | |
|---|---|---|
| 4,699,436 | 10/1987 | Klein . |
| 4,740,039 | 4/1988 | Hattwig .................... 188/349 |
| 4,824,185 | 4/1989 | Leiber et al. . |
| 4,824,186 | 4/1989 | Leiber et al. . |
| 4,943,123 | 7/1990 | Takeda et al. ............... 303/113.5 X |
| 5,021,957 | 6/1991 | Yoshino et al. ............. 303/113.5 X |
| 5,163,742 | 11/1992 | Töpfer et al. . |
| 5,167,441 | 12/1992 | Schonlau et al. ............. 188/349 X |
| 5,180,211 | 1/1993 | Wiese et al. ................. 303/113.5 X |

FOREIGN PATENT DOCUMENTS

| | | |
|---|---|---|
| 3323402 | 10/1984 | Fed. Rep. of Germany . |
| 3329706 | 3/1985 | Fed. Rep. of Germany . |
| 3723916 | 1/1989 | Fed. Rep. of Germany . |
| 3728480 | 1/1989 | Fed. Rep. of Germany . |
| 3723917 | 2/1989 | Fed. Rep. of Germany . |
| 3742173 | 6/1989 | Fed. Rep. of Germany . |
| 4029332 | 5/1991 | Fed. Rep. of Germany . |
| 4007360 | 9/1991 | Fed. Rep. of Germany . |
| 4022481 | 10/1991 | Fed. Rep. of Germany . |
| 56-8743 | 1/1981 | Japan ........................ 303/DIG. 4 |
| 58-105863 | 6/1983 | Japan ........................ 303/DIG. 3 |
| 61-37562 | 2/1986 | Japan ........................ 188/349 |
| 62-238156 | 10/1987 | Japan ........................ 188/349 |

*Primary Examiner*—Douglas C. Butler
*Attorney, Agent, or Firm*—Abelman Frayne & Schwab

[57] ABSTRACT

A first target value is set as an initial value of split point pressure, a master cylinder pressure is set as a second target value of split point pressure in a memory when ABS valves (17, 20, and 23) are operated, thereafter when a sign of locking of the rear wheels is detected, the target value is reduced even further and set in the memory, the target value is maintained for a predetermined time by timer control at every setting of a new target value, and when a braking deceleration generated while the target value is maintained in the memory, a controller (37) controls so that the target value is increased after the completion of braking. When the master cylinder pressure is higher than the target value stored in the memory, proportioning valves (26 and 27) are closed to decrease a ratio of the rear wheel braking force to the front wheel braking force, thereby always achieving appropriate control over the rear wheel braking force allocation.

36 Claims, 11 Drawing Sheets

REAR WHEEL BRAKING FORCE CONTROL APPARATUS AND CONTROL METHOD THEREFOR

BACKGROUND OF THE INVENTION

This invention relates to an apparatus for controlling rear wheel braking force of a vehicle to control allocation of front wheel braking force and rear wheel braking force.

When a brake pedal is pressed down, a braking hydraulic pressure (hereinafter called a "master cylinder pressure") generated in a master cylinder is transmitted to wheel cylinders of four wheel to generate braking forces on the individual wheels.

Since, when the amount of pressing down the brake pedal is increased, the braking forces generated on the individual wheels are increased, deceleration of the vehicle increases. When the deceleration of the vehicle increases, a rear wheel load decreased, resulting in a decrease in surface gripping of rear wheels. In such a braking condition that braking (high-G braking) is generated to increase the deceleration of the vehicle, there is a problem in that, when the master cylinder pressure is distributed and transmitted almost equally to the front and wheel cylinders, the rear wheels tend to lock earlier resulting in deteriorated braking stability of the vehicle.

Therefore, a proportioning valve (PCV) has been incorporated in a brake system, which functions to transmit the master cylinder pressure, as is, to the wheel cylinder of the rear wheels when the braking force is small, and reduce increasing rate of hydraulic pressure transmitted to the wheel cylinder of the rear wheels when the master cylinder pressure exceeds a preset value, thereby preventing early locking of the rear wheels.

Furthermore, there is proposed a rear wheel braking force control apparatus in which a bypass valve for bypassing the proportioning valve, the bypass valve is opened until the above preset pressure is reached, when the preset pressure is exceeded, the bypass valve is closed to function the proportioning valve, and a split point pressure is variably set to adequately control braking force allocation to the rear wheels (Japanese Patent Application 3-315660/1991).

As a prior art example which discloses a concept similar to the above point of view, in an apparatus which is disclosed in Japanese Patent Laid-open Publication 60-47750 (DE 3329706, FR 3329706), the action of the proportioning valve is normally made effective but, when an antiskid brake system (ABS) operates, the action of the proportioning valve is invalidated by an electromagnetic valve to use the rear wheel braking force up to a locking limit.

Furthermore, Japanese Patent Laid-open Publication 1-257652 (DE 3742173, FR 2624462, GB 2213543), Japanese Patent Laid-open Publication 3-208760 (DE 4029332, GB 2238092, FR 2654401) describe an apparatus in which the action of the proportioning valve is normally invalidated by an electromagnetic valve to increase braking force allocation to the rear wheels for reducing burden to a front wheel braking apparatus, but only when the ABS system malfunctions, the electromagnetic valve is operated to effect the action of the proportioning valve, thereby ensuring safety.

However, in the former prior art example, since the braking force allocation to the rear wheels is controlled by the proportioning valve before the ABS system operates, the braking force allocation tends to be excessively lowered on a road surface with a high rear wheel locking limit, resulting in an increase in burden to the front wheel brakes. When the ABS system operates, since braking force allocation to the rear wheels is increased, a rapid locking behavior of the rear wheels occurs, and hydraulic pressure control of the ABS system tends to become unstable, leading to a deterioration of control accuracy.

In the latter prior art example, despite the braking force allocation to the rear wheels is enhanced to reduce burden to the front wheel brakes, the braking force allocation to the rear wheels is maintained at a high level also when the ABS system operates, and the control accuracy of the ABS system tends to be deteriorated as in the former prior art example. Moreover, the proportioning valve can function merely when the ABS system malfunctions, and the action of the proportioning valve cannot be effectively utilized.

Therefore, it is a primary object of the present invention to appropriately control the braking force allocation to the rear wheels in cooperation with the ABS system.

SUMMARY OF THE INVENTION

The above object is attained by an apparatus and method according to the present invention.

In accordance with the present invention, there is provided a rear wheel braking force control apparatus comprising braking degree detection means for detecting a braking degree (PM) when a vehicle is braked and control means, wherein an electromagnetic valve is operated to invalidate action of a proportioning valve when the braking degree detected by the braking degree detection means is weaker than a setting value, the electromagnetic valve is operated to effect the action of the proportioning valve when the braking degree is stronger than the setting value, and the setting value is corrected to a lower value when operation of a rear wheel antiskid brake system is detected.

With the apparatus according to the present invention, when the braking degree detected by the braking degree detection means is weaker than the setting value and there is a room in the rear wheel braking force, the electromagnetic valve is operated to reduce the braking force burden to the front wheels by invalidating the action of the proportioning valve, and when the braking degree becomes stronger than the setting value and there is no room in the rear wheel braking force, the electromagnetic valve is operated to effect the action of the proportioning valve, thereby preventing early locking of the rear wheels by the function of the proportioning valve.

Especially, since the above setting value is corrected to a lower value when operation of the rear wheel antiskid brake system is detected, the proportioning valve operates earlier on a road surface where the rear wheels tend to lock to reduce rear wheel braking force allocation, thereby preventing deterioration in control accuracy of the rear wheel antiskid brake system.

Thus, with the present invention, the braking force burden of the front wheels can be reduced while effectively utilizing the early locking prevention effect of the rear wheels by the proportioning valve, and the braking degree at which the proportioning valve begins to operate can be appropriately controlled according to the road surface condition, thereby achieving a high braking effect. Specifically, when operation of the rear wheel antiskid brake system is detected, since the braking degree at which the proportioning valve begins to operate is reduced, it is possible to operate the proportioning valve at an earlier time on a slippery road surface, preventing early locking of the rear wheels and control accuracy of the antiskid brake system from being deteriorated, and when the road surface is hard to slip, to relatively increase the rear wheel braking force allocation, thereby reducing braking force burden to the front wheels. Therefore, abrasion of the front wheel brakes can be reduced to extend the life of the brake pads, heat evolution at the front wheel brakes to improve the fading resistance with improved reliability, and nose diving is reduced to enhance braking stability.

In a preferred embodiment of the present invention, the above setting value is set lower when the rear wheel antiskid brake system operates earlier than the front wheel antiskid brake system, thereby preventing occurrence of a locking tendency in the rear wheels earlier than the front wheels with improved safety.

As another preferred embodiment of the present invention, by setting a braking degree detected by the braking degree detection means when the rear wheel antiskid brake system is operated is set as a setting value, braking force allocation to the rear wheels can be appropriately controlled.

As another preferred embodiment of the present invention, an initial setting value is set to a maximum settable value or duration of a lower setting value is limited to a predetermined period of time and corrected to a higher value when the predetermined time is over, thereby promoting effective utilization of the rear wheel braking force.

As another preferred embodiment of the present invention, after the setting value is set to a lower value, and the setting value is corrected to a higher value when a deceleration of more than a predetermine value is detected during braking or when the braking degree detected by the braking degree detection means is more than the predetermined value and a slip rate of the rear wheels is less than a predetermined value, thereby preventing excessive reduction in the setting value and promoting effective utilization of the rear wheel braking force.

As another preferred embodiment of the present invention, the rear wheel antiskid brake system, the proportioning valve, and the electromagnetic valve are provided for the individual right and left rear wheels, and the setting values are corrected independent of each other for the right and left rear wheels according to the operation condition of the corresponding rear wheel antiskid brake system, thereby controlling the right and left wheels independent of each other and achieving appropriate control for braking or turning on a split road.

The method according to the present invention can be applied to the apparatus according to the present invention, and the same effect is obtained as the effect described above on the apparatus of the present invention.

These and other objects, features, and advantages of the present invention will become more apparent from the description given hereinbelow.

DETAILED DESCRIPTION OF THE EMBODIMENTS

Figure 1:
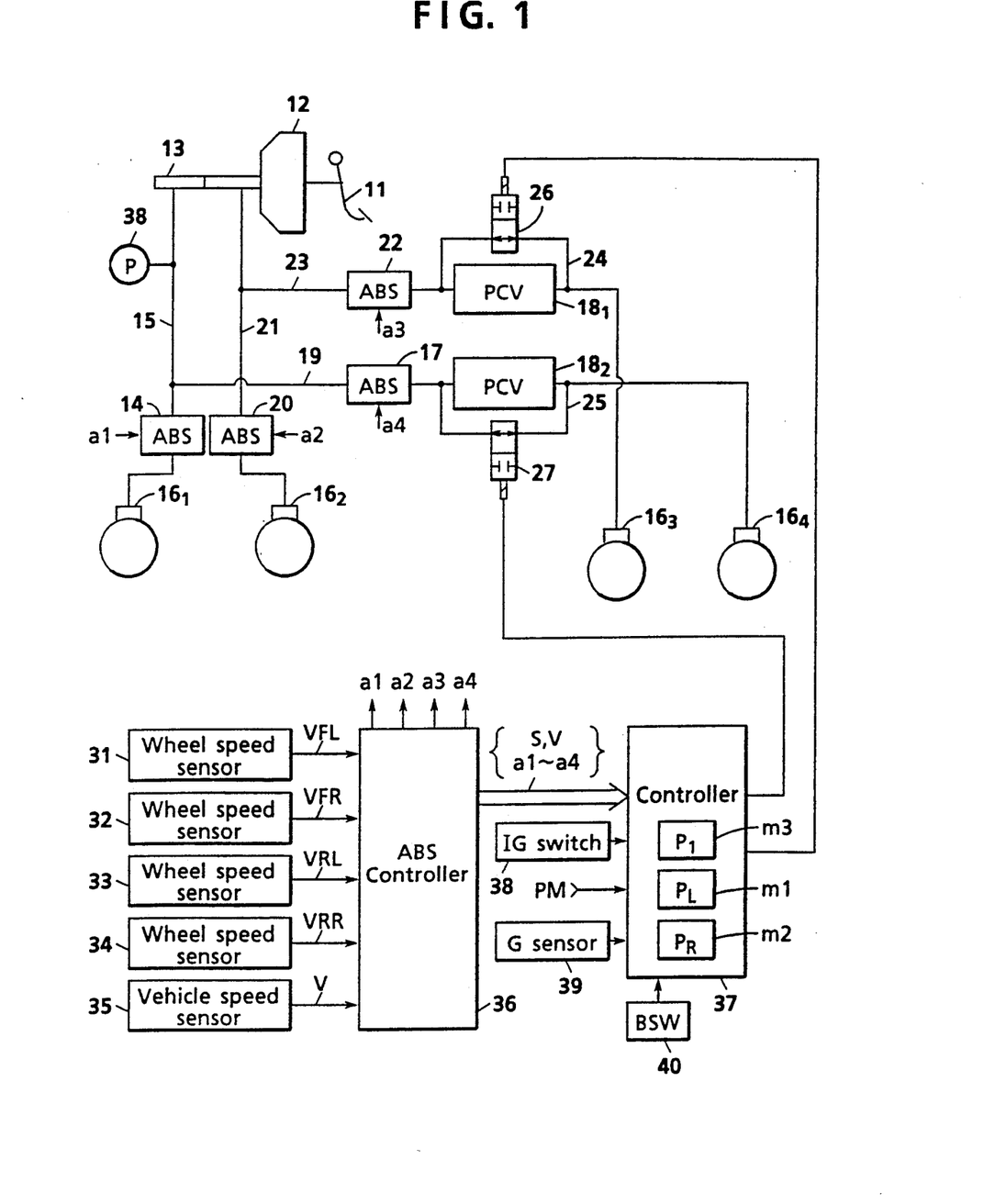
FIG. 1 is a block diagram showing an embodiment of the rear wheel braking force control apparatus according to the present invention.

In FIG. 1, numeral 11 indicates a brake pedal. Pressing force of the brake pedal is amplified through a brake booster unit 12, and then transmitted to a tandem master cylinder 13.

The master cylinder 13 is provided with two hydraulic pressure generators (not shown) which generate a brake hydraulic pressure according to the pressing amount of the brake pedal 11. One hydraulic pressure generator is connected to a wheel cylinder $16_1$ of the left front wheel through a pipe 15 provided with an ABS valve 14 for ABS (antilock brake system), and also to a wheel cylinder $16_4$ of the right rear wheel through a pipe 19 branched halfway from the pipe 15 and provided with an ABS valve 17 and $PCV18_2$.

The other hydraulic pressure generator is connected to a wheel cylinder $16_2$ of the right front wheel through a pipe 21 provided with an ABS valve 20, and also to a wheel cylinder $16_3$ of the left rear wheel through a pipe 23 branched halfway from the pipe 21 and provided with an ABS valve 22 and $PCV18_1$.

$PCV18_1$ and $18_2$ are proportioning valves which function to transmit the master cylinder pressure, as is, to the wheel cylinders of the rear wheels when the braking force is small, and reduce an increasing rate of hydraulic pressure transmitted to the wheel cylinders of the rear wheels when the master cylinder pressure is at a setting pressure or more.

Figure 5:
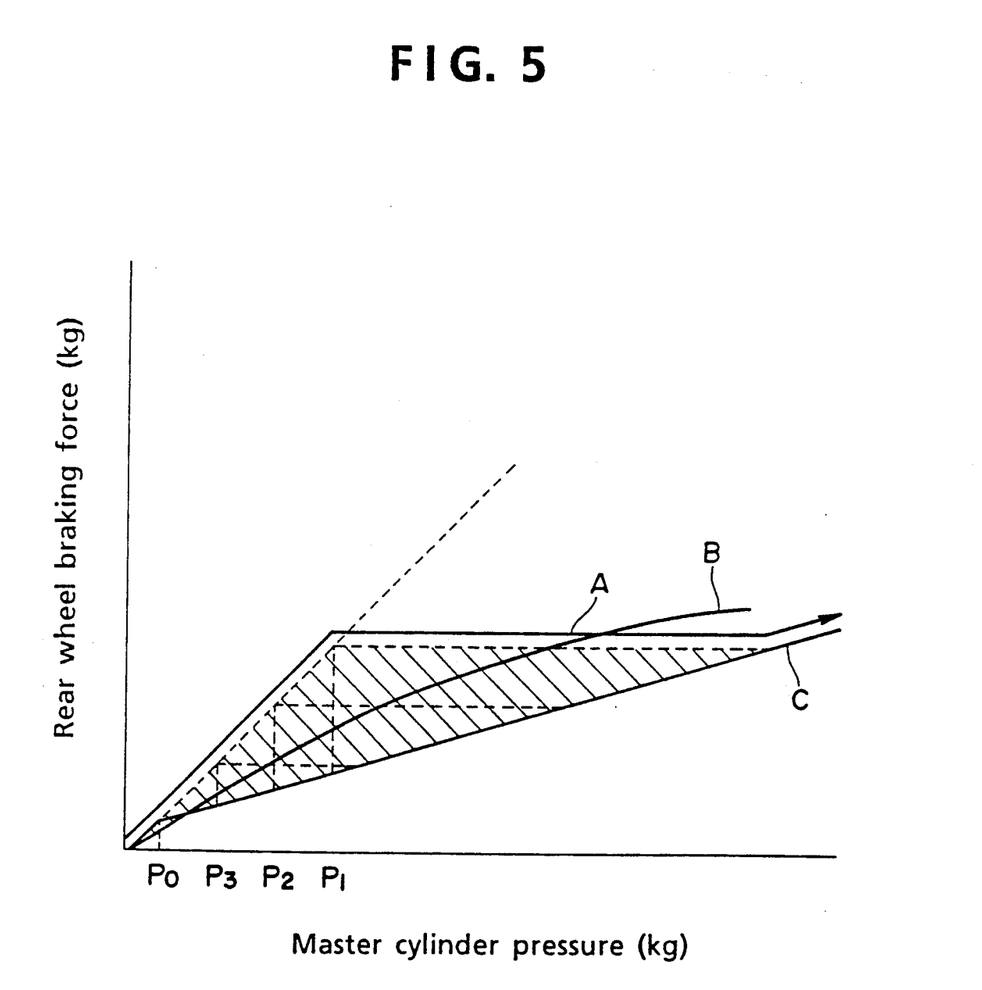
FIG. 5 is a diagram showing input and output characteristics of a proportioning valve.
Figure 6:
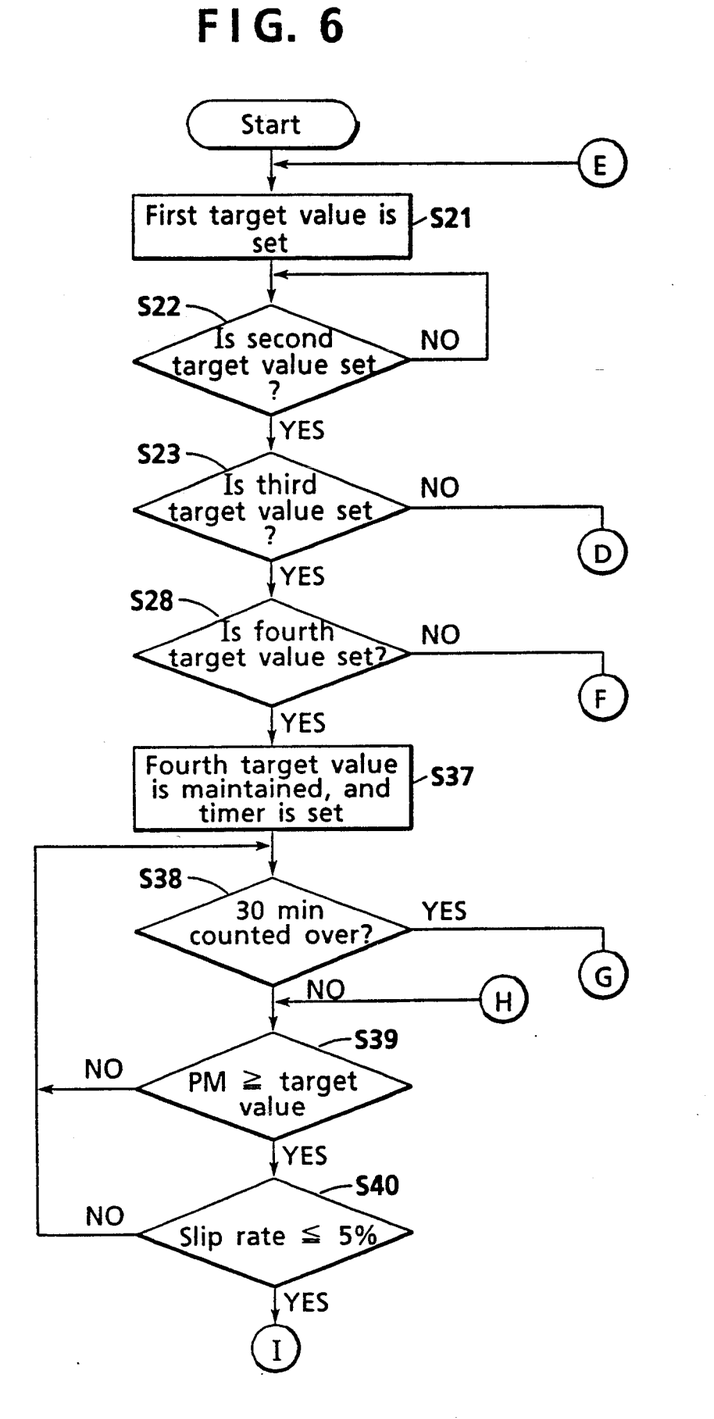
FIGS. 6, 7, 8 and 9 are flow charts showing operation of increasingly correcting a target value of split point.
Figure 7:
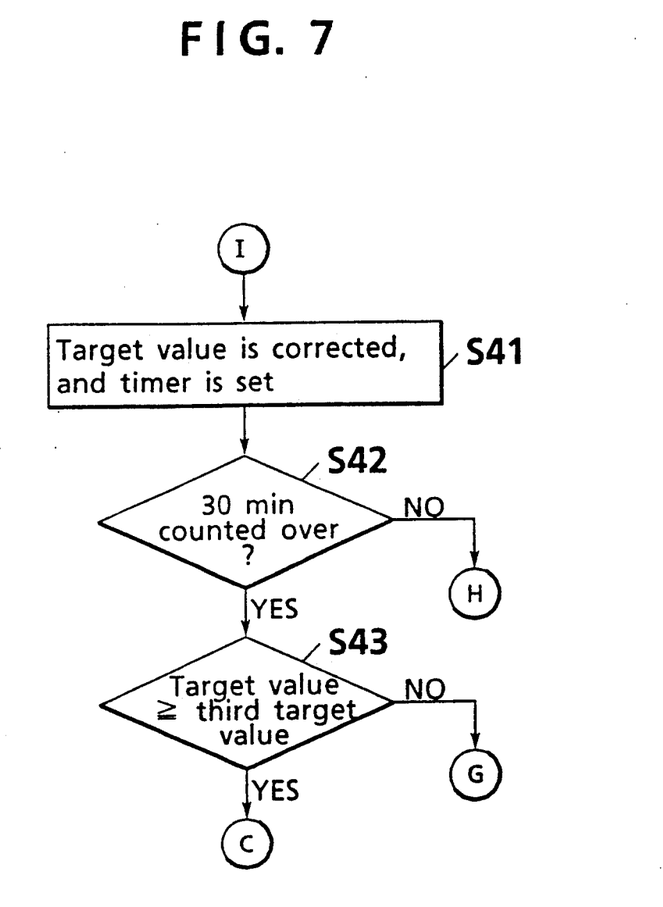

Characteristic curve of $PCV18_1$ and $PCV18_2$, as indicated by solid line C in FIG. 5, has a gradient of 1 in an area where the master cylinder pressure is smaller than a setting pressure $P_o$, and when the master cylinder pressure exceeds the setting pressure $P_o$, decreases in gradient of the rear wheel braking force with respect to the master cylinder pressure. The setting pressure $P_o$ is solely determined by mechanical factors of $PCV18_1$ and $PCV18_2$.

A bypass pipe 24 is provided between the upstream side and the downstream side of the $PCV18_1$, and a bypass pipe 25 is provided between the upstream side and the downstream side of the $PCV18_2$. The bypass pipes 24 and 25 are individually provided with PCV bypass valves 26 and 27 which are electromagnetic valves of a normally-open type.

Thus, by variably setting the master cylinder pressure for closing the PCV bypass valves 26 and 27, the rear wheel braking force can be controlled within the hatched area in FIG. 5, and a higher braking force than indicated by an ideal braking force curve B can be generated.

Numeral 31 indicates a wheel speed sensor for detecting a wheel speed VFL of the left front wheel, numeral 32 indicates a wheel speed sensor for detecting a wheel speed VFR of the right front wheel, numeral 33 indicates a wheel speed sensor for detecting a wheel speed VRL of the left rear wheel, numeral 34 indicates a wheel speed sensor for detecting a wheel speed VRR of the right rear wheel, and numeral 35 indicates a vehicle speed sensor for detecting a vehicle speed V. The individual wheel speed signals VFL, VFR, VRL, VRR, and the vehicle speed signal V are inputted to an ABS controller 36.

The ABS controller 36, which comprises a microcomputer and its peripheral circuits, calculates a slip rate S of each wheel according to the individual wheel speeds VFL, VFR, VRL, and VRR, and the vehicle speed V, and outputs ABS signals a1-a4 to ABS valves 14, 20, 22, and 17 provided for the individual wheels. The ABS signals a1-a4 mean, for example, pressure increase signals for supplying brake fluid to the wheel cylinders $16_1$-$16_4$ according to the signal level, maintaining signals for maintaining brake fluid supplied to the wheel cylinders $16_1$-$16_4$, and pressure reduction signals for removing brake fluid from the wheel cylinders $16_1$-$16_4$. The ABS controller 36 outputs first the maintaining signals when the slip rate S of the wheels exceeds a predetermined value, and then outputs the pressure reduction signals.

The ABS controller 36 outputs the ABS signals a1-a4, the slip rate signal S, and the vehicle speed signal V, for example, to a controller 37 comprising a microcomputer and its peripheral circuits. Furthermore, a master cylinder pressure signal PM outputted from a pressure sensor 38 provided on the pipe 15 for detecting the master cylinder pressure, a detection signal from a G sensor 39 for detecting a longitudinal direction acceleration, and a detection signal of a brake switch (BSW) which outputs an ON signal when the brake pedal (not shown) is pressed down are inputted to the controller 37. The controller 37 controls ON/OFF operation of the PCV bypass valves 26 and 27 independent of each other.

The controller 37 is provided with a memory m1 storing the master cylinder pressure for closing the PCV bypass valve 26 for bypassing the left rear wheel $PCV18_1$, that is, a split point pressure PL of the left rear wheel, a memory m2 storing the master cylinder pressure for closing the PCV bypass valve 27 for bypassing the right rear wheel $PCV18_2$, that is, a split point pressure PR of the right rear wheel, and a memory m3 storing a split point pressure P1 when a 0.6 G braking is performed on a high-$\mu$ road. The memory m3 is formed of a ROM (read only memory). The controller 37, which stores a control program for setting the split point pressures PL and PR to the individual memories m1 and m2 according to the inputted ABS signals a1-a4, compares the master cylinder pressure PM with the split point pressure PL and PR set in the memories m1 and m2 at every predetermined sampling time, when PM≧PL, closes the PCV bypass valves 26 for bypassing the left rear wheel $PCV18_1$, and when PM≧PR, closes the PCV bypass valve 27 for bypassing the right rear wheel $PCV18_2$.

For example, as shown in FIG. 5, when the split point pressure PL (PR) is higher than the setting pressure $P_o$, the PCV bypass valve 26 (27) is open until the master cylinder pressure is P1, and the rear wheel braking force varies as indicated by A, increasing the rear wheel braking force.

Figure 2:
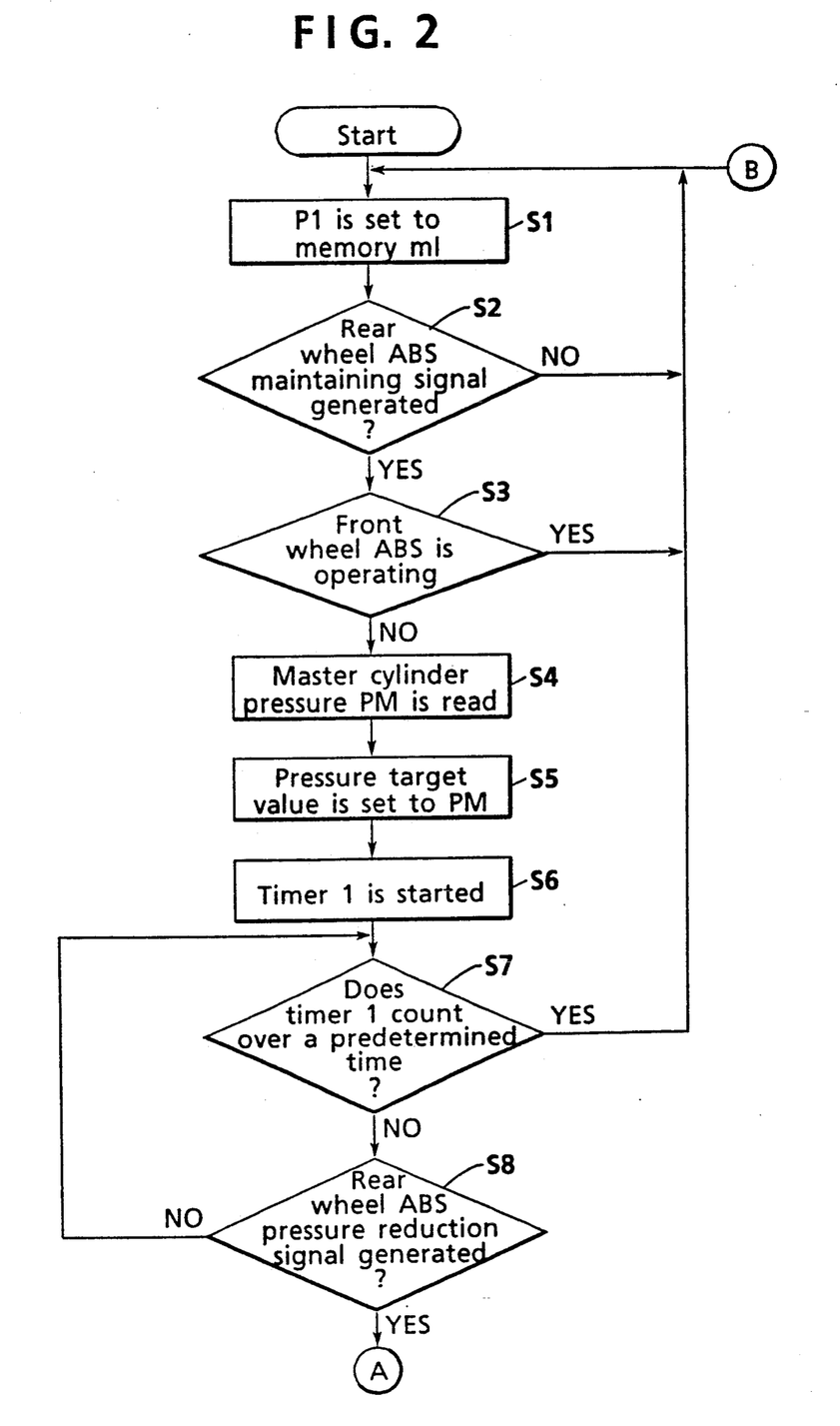
FIG. 2 and FIG. 3 are flow charts for explaining operation of the embodiment.
Figure 3:
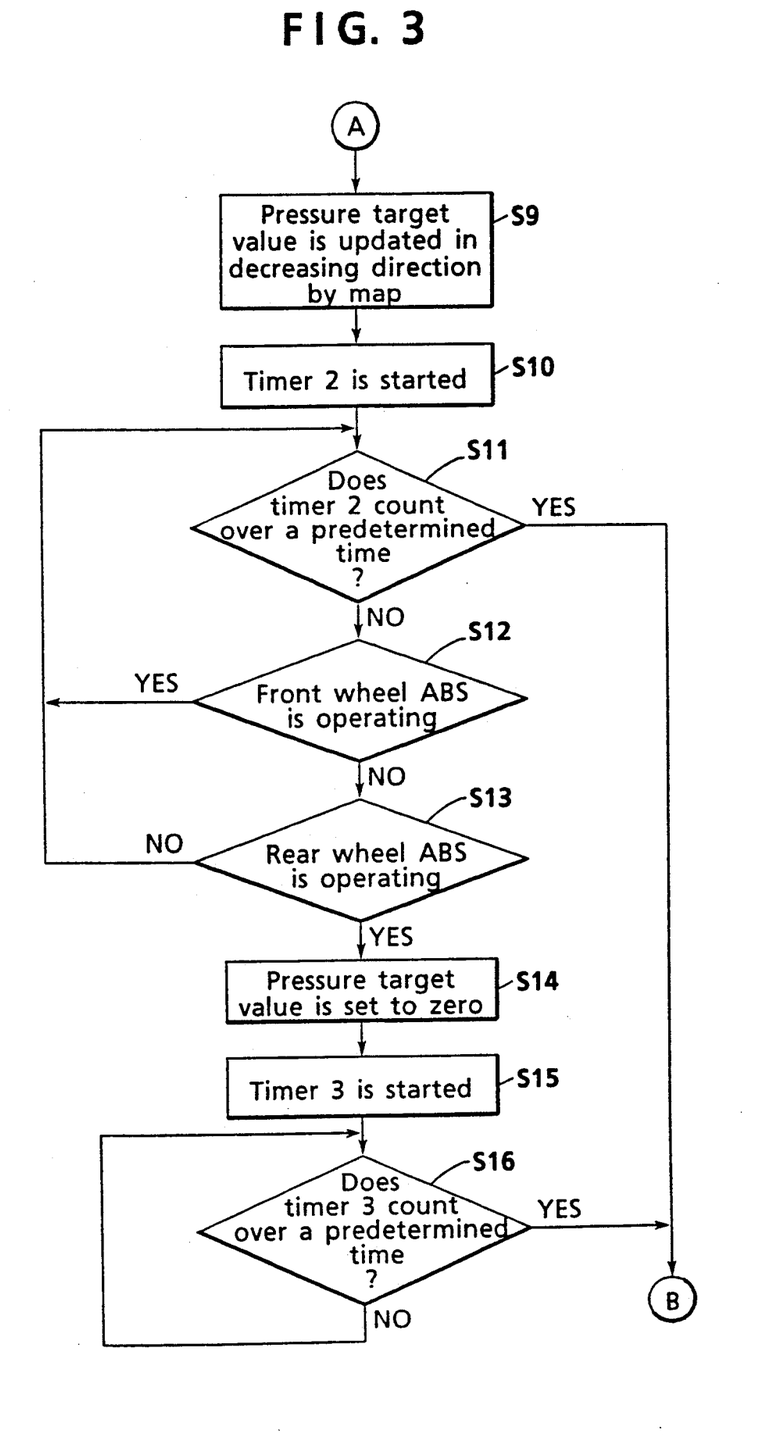

The flow charts in FIG. 2 and FIG. 3 show the contents of the control program for setting the split point pressure PL for closing the PCV bypass valve 26 for bypassing one of the rear wheels, for example, the left rear wheel $PCV18_1$. The flow chart for setting the split point pressure PR for closing the PCV bypass valve 27 for bypassing the right rear wheel $PCV18_2$ is the same in contents, and detailed description thereof is omitted.

Then, operation of the embodiment of the above arrangement according to the present invention will now be described. First, a pressure P1 stored as an initial value in the memory m3 is set to the memory m1 storing the split point pressure PL at which the PCV bypass valve 26 for bypassing the $PCV18_1$ of the left rear wheel (step S1). Then, an ABS signal a3 outputted to the ABS valve 22 of the left rear wheel is determined as to whether it is a maintaining signal (step S2). When the result of determination in step S2 is YES, an ABS signal a1 outputted to the ABS valve 14 of the left front wheel is determined as to whether or not the ABS valve 14 is operating, that is, determination is made as to whether or not a maintaining signal or a pressure reduction signal is outputted to the ABS valve 14 (step S3). When it is determined in step S3 that the ABS valve 14 of the left front wheel is not operating, a processing for updating the split point pressure PL set in the memory m1 in step S1 is performed in the processing in step S4 and after. That is, when it is determined that a slip generates at the left rear wheel earlier than the left front wheel, a correction processing is made to reduce the split point pressure PL of the left rear wheel. Specifically, at the time it is determined as NO in step S2, the master cylinder pressure PM detected by the pressure sensor 38 is read, and the memory m1 is updated to set it as a second target value (steps S4, S5). Then, the timer 1 is started to count, when a pressure reduction signal is detected as the ABS signal a3 outputted to the ABS valve 22 of the left rear wheel before a predetermined time is counted by the timer 1 (steps S6-S8), the processing goes to step S9 and after where a correction is made to reduce the split point pressure PL of the left rear wheel even further.

In step S5, when a pressure reduction signal is not outputted as the ABS valve signal a3 within the predetermined time counted by the timer after the contents of the memory m1 are updated, the processing is returned to step S8 to step S7 where the processing is repeated, and the split point pressure PL set in the memory m1 is maintained at the updated value until the timer 1 counts over the predetermined time. That is, if slip in the rear wheels advances, the ABS signal a3 outputted to the ABS valve 22 of the left rear wheel is changed over from the maintaining signal to the pressure reduction signal. However, since a pressure reduction signal is not generated within a predetermined time after the maintaining signal is outputted, it is determined that no slip advances in the rear wheels and braking force allocation to the rear wheels is adequate, and the split point pressure PL is maintained for a predetermined time. When, in step S7, the timer 1 completes the counting of the predetermined time, the processing returns to step S1 where the same processing is repeated.

When the determination result in step S8 is YES, that is, when a pressure reduction signal is detected as the ABS signal a3 outputted to the ABS valve 22 of the left rear wheel before the timer 1 counts over the predetermined time, an update processing is made to reduce even further the split point pressure PL to be set in the memory m1 by a map (not shown), and a third target value is set (step S9). Then, a timer 2 is started to count, when an operation signal is not outputted as the ABS signal A1 to be outputted to the ABS valve 14 of the left front wheel before the timer 2 counts over a predetermined time, that is, when no maintaining signal nor pressure reduction signal is outputted, and an operation signal is outputted as the ABS signal a3 to be outputted to the ABS valve 22 of the left rear wheel, that is, a maintaining signal or a pressure reduction signal is outputted, the processing goes to step 14 and after where the split point pressure PL set to the memory m1 is set to zero.

That is, the case where the split point pressure PL is set to zero is only when the ABS signal is outputted only to the left rear wheel within a predetermined time after the split point pressure PL is set to be reduced in step S9. In such a case, since the braking force of the left rear wheel is too high, it is determined that the left rear wheel is slipping, and the split point pressure PL is reduced to zero to reduce the rear wheel braking force even further.

When, in step S9, an operation signal (maintaining signal or pressure reduction signal) is outputted as the ABS signal a1 to be outputted to the ABS valve 14 of the left rear wheel within a predetermined time counted by the timer 2 after the contents of the memory m1 are updated, or when an operation signal (maintaining signal or pressure reduction signal) is not outputted as the ABS signal a1 to be outputted to the ABS valve 14 of the left front wheel, and an operation signal is not outputted as the ABS signal a3 to be outputted to the ABS valve 22 of the left rear wheel, the processing is returned to step S11, the same processing is repeated, and the split point pressure PL to be set to the memory m1 is maintained at the value set in step S9 until the timer 2 counts over the predetermined time. That is, when the ABS valve 14 of the left front wheel is operating, processing is made so that the split point pressure PL is maintained for a predetermined time.

When the determination result in step S13 is YES, the split point pressure PL to be set in the memory m1 is set to zero as a fourth target value, and a timer 3 is started to count. The split point pressure PL to be set in the memory m1 is maintained at zero until the timer counts over a predetermined time.

Figure 10:
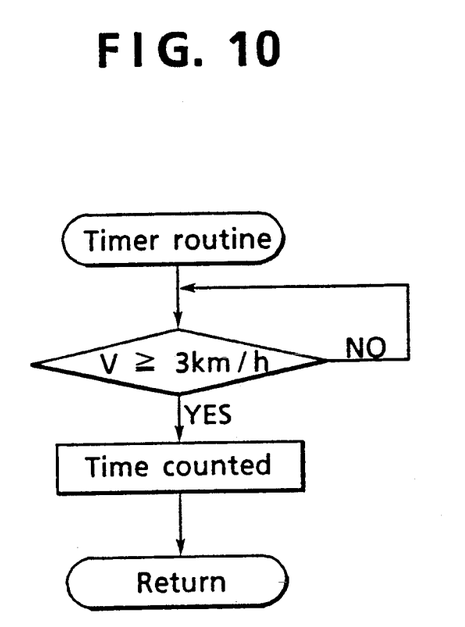
FIG. 10 is a flow chart for explaining counting operation of a timer.

The timers 1 to 3, as shown in FIG. 10, are set to count time only when the vehicle speed V is 3 km/h or more, that is, when the vehicle is traveling.

That is, since the condition "PM≧" is always met by setting the split point pressure PL to be set in the memory m1 to zero, the controller 37 can always close the PCV bypass valve 26. Therefore, the PCV18$_1$ is always operated, the braking force indicated by the solid line in FIG. 5 is made due to the characteristics of the PCV18$_1$, and the split point pressure is maintained at Po shown in FIG. 5 for a predetermined time, thereby effectively suppressing slip of the rear wheels.

When the timer 3 counts over the predetermined time and the determination result in step S16 is YES, the processing returns to step S1 where the initial value P1 of the split point pressure PL is set in the memory m1.

That is, when, after the pressure P1 as shown in the Figure is set as the split point pressure PL, a slip of the rear wheels is detected by the ABS signal, the split point pressure is reduced sequentially. Therefore, even after the split point pressure is once set, the split point pressure can be reduced to increase the rear wheel braking force within a range where no slip generates in the rear wheels.

Furthermore, since the split point pressures PL and PR at which the left and right PCV bypass valves 26 and 27 are independently set to be open/close controlled, an optimum braking force can be obtained even on a road where frictional coefficients for the right and left wheels are different, that is, at braking on a split road or at turning braking.

Furthermore, since, after the split point pressure is set, that value is maintained for a predetermined time by timer control, setting change of the target value can be reduced, and variation in braking feeling is prevented.

Furthermore, since counting by the timers 1 to 3 is made only during traveling of the vehicle, the target value set can only be utilized during traveling of the vehicle. This prevents that the times 1 to 3 count over while the vehicle is not traveling, the target value is re-set to a high value in spite of unchanged road condition, and the ABS is operated unnecessarily.

Figure 4:
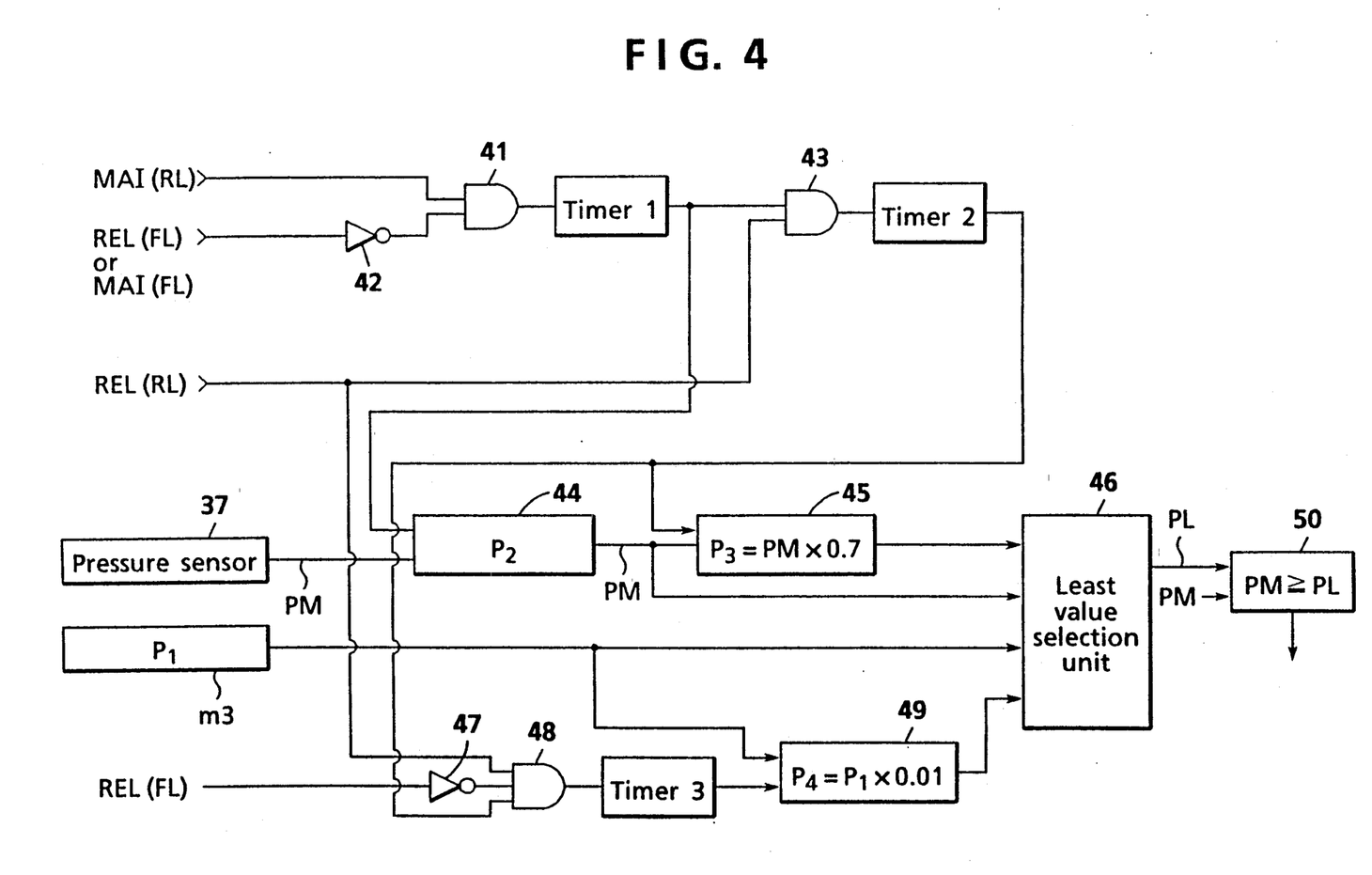
FIG. 4 is a block diagram for explaining function of a controller.

The function of the controller 37 is shown in the block diagrams in FIG. 4. In FIG. 4, a maintaining signal MAI (RL) of the left rear wheel is a logical signal which is at H level when the ABS signal a3 outputted from the ABS controller 36 to the ABS valve 22 is a maintaining signal, and L level for other signals, a pressure reduction signal REL (FL) of the left front wheel is a logical signal which is at H level when the ABS signal a1 outputted from the ABS controller 36 to the ABS valve 14 is a pressure reduction signal, and L level for other signals, MAI (FL) is a logical signal which is at H level when the ABS signal a1 outputted from the ABS controller 36 to the ABS valve 14 is a maintaining signal, and L level for other signals, and a pressure reduction signal REL (FL) of the left rear wheel is a logical signal which is at H level when the ABS signal a1 outputted from the ABS controller 36 to the ABS valve 14 is a maintaining signal, and L level for other signals.

The maintaining signal MAI (RL) is inputted into one input terminal of an AND circuit 41, and the pressure reduction signal REL (FL) or the maintaining signal MAI (FL) is inputted into the other input terminal of the AND circuit 41 through an inverter 42.

Output of the AND circuit 41 is inputted into an input terminal of the timer 1. The timer 1 maintains an H level condition for a predetermined time after the output of the AND circuit rises to the H level.

Output of the timer 1 is inputted into one input terminal of an AND circuit 43. The other input terminal of the AND circuit 43 is inputted with the pressure reduction signal REL (RL). Output of the AND circuit 43 is inputted into the timer 2. The timer 2 maintains an H level condition for a predetermined time after the output of the AND circuit 43 rises to the H level.

Furthermore, output of the timer 1 is inputted into a maintaining unit 44 for maintaining the second target value P2 of the split point pressure. The maintaining unit 44 is inputted with the master cylinder pressure PM outputted from the pressure sensor 37. The maintaining unit 44 maintains the master cylinder pressure PM only while the output of the timer 1 is in the H level condition.

Output of the maintaining unit 44 is inputted into a maintaining unit 45. The maintaining unit 45 maintains the third target value of the split point pressure. The maintaining unit 45 maintains a value of the split point pressure PM outputted from the maintaining unit 44 multiplied by 0.7 while the output of the timer 2 is inputted and the output of the timer 2 is in the H level condition.

The second target value P2 maintained in the maintaining unit 44 and the third target value P3 maintained in the maintaining unit 45 are inputted into a least value selection unit 46. The least value selection unit 46 is inputted with the initial value P1 of the split point pressure set in the memory m1.

Furthermore, the REL (FL) signal is inputted into a first input terminal of an AND circuit 48 through an inverter 47, and the REL (RL) signal and the output of the timer 2 are individually inputted to a second input terminal and a third input terminal of the AND circuit 48.

Output of the AND circuit 48 is inputted into the timer 3. The timer 3 maintains H level for a predetermined time after the output of the AND circuit 48 is H level. Output of the timer 3 is inputted into a maintaining unit 49 for maintaining a fourth target value P4. The maintaining unit 49 is inputted with the initial value P1 of the split point pressure stored in the memory m3, and maintains a value of the initial value P1 multiplied by 0.01 as the fourth target value. Output of the maintaining unit 49 is inputted into the least value selection unit 46. Thus, since it is previously known that when the initial value P1 is multiplied by 0.01, it is smaller than the setting pressure Po in FIG. 5, the initial value is multiplied by 0.01 in this case. However, alternatively, zero may be set as the fourth target value P4 as in the above-described flow chart, anyhow, a value smaller than Po is sufficient. The split point pressures P1 to P4 are shown in FIG. 4.

Furthermore, the split point pressure is multiplied by 0.7 in the maintaining unit 45, however, alternatively, it may be determined from a map as in the processing in the above-described flow chart. Needless to say that the reverse can be applied to the processing in the above-described flow chart.

The least vale selection unit 46 selects a least value of the first to fourth target values P1 to P4 inputted, and outputs it to a comparator 50 as a target pressure PL. The comparator 50 compares the master cylinder pressure PM outputted from the pressure sensor 37 with the target pressure outputted from the least value selection unit 46, and when "PM≧PL," outputs a control start signal for closing the PCV bypass valve 26 to a drive circuit (not shown). Counting of the timers 1 to 3, as shown in FIG. 10, is made only while the vehicle is traveling (V≧3 km/h).

Figure 11:
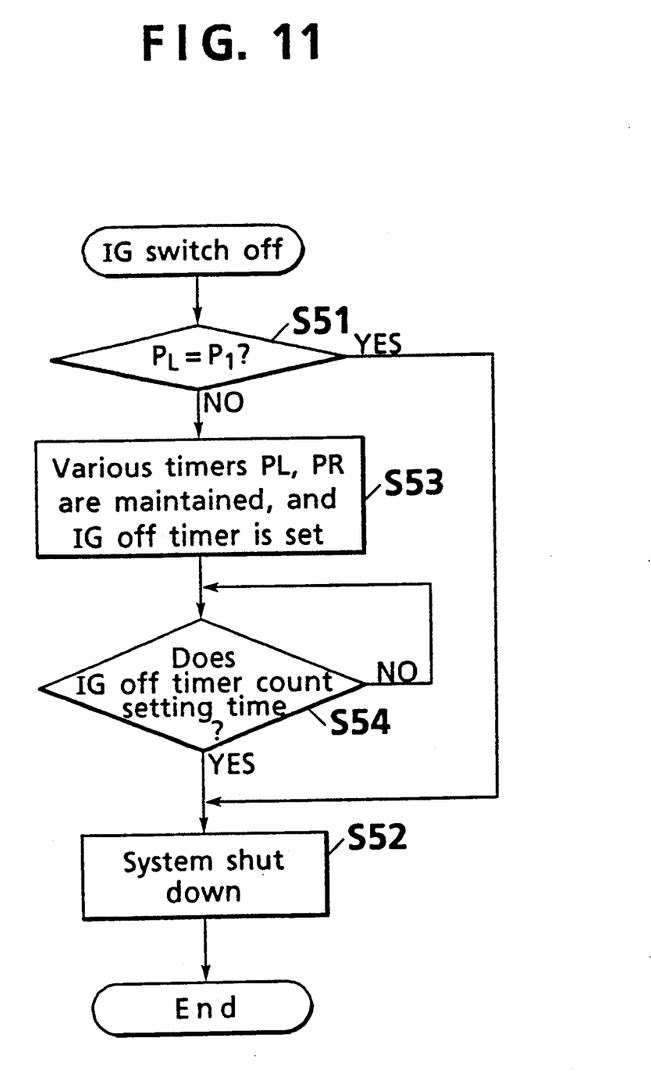
FIG. 11 is a flow chart showing operation when an ignition switch is turned off.

When an ignition switch (not shown) is turned off, a detection signal from an IG switch 38 is inputted into the controller 37, and processing shown in the flow chart in FIG. 11 is performed. First, determination is made as to whether or not the split point pressure PL stored in the memory m1 is equal to the first target value P1 stored in the memory m3 (step S51). When the determination result in step S51 is YES, a system shut-down processing to stop supply of current to the controller 37 is performed (step S52).

When the determination result in step S51 is NO, the count values of the timers 1 to 3 and the split point pressures PL and PR individually stored in the memories m1 and m2 are maintained, and an IG off timer is set (step S53).

Then, determination is made as to whether or not the IG off timer counts over the setting time (step S54). The processing goes to the above-described step S52, and the system is shut-down.

When the ignition switch is turned on again before the IG off timer counts over the setting time, rear wheel braking force allocation control is performed according to the count values of the timers 1 to 3 and the split point pressures PL and PR maintained in the memories m1 and m2.

For this purpose, when the ignition switch is once turned off at parking or the like and the vehicle is re-started after the lapse of the setting time, since the data at the time the ignition switch is turned off is maintained, locking of the rear wheels and operation of ABS due to excessively high rear wheel braking force can be prevented when the vehicle is restarted.

Furthermore, since the system is immediately shut down when the split point pressure PL stored in the memory m1 is equal to the first target value P1 stored in the memory m3 at the time the ignition switch is turned off, an energy-saving effect is achieved. That is, in this case, since the first target value P1 is stored in the memory m3, it is not necessary to maintain the value.

Then, correction processing for increasing the target value during the operation of the timers 1 to 3 will be described with reference to FIGS. 6 to 9. In FIGS. 6 to 9, the initial value of the split point, that is, P1 as the first target value, is first set to the memories m1 and m2 (step S21). And, determination is made as to whether or not the above-described second target value is set in the memories m1 and m2 (step S22). The processing of step S22 until YES is determined in step S22.

Figure 8:
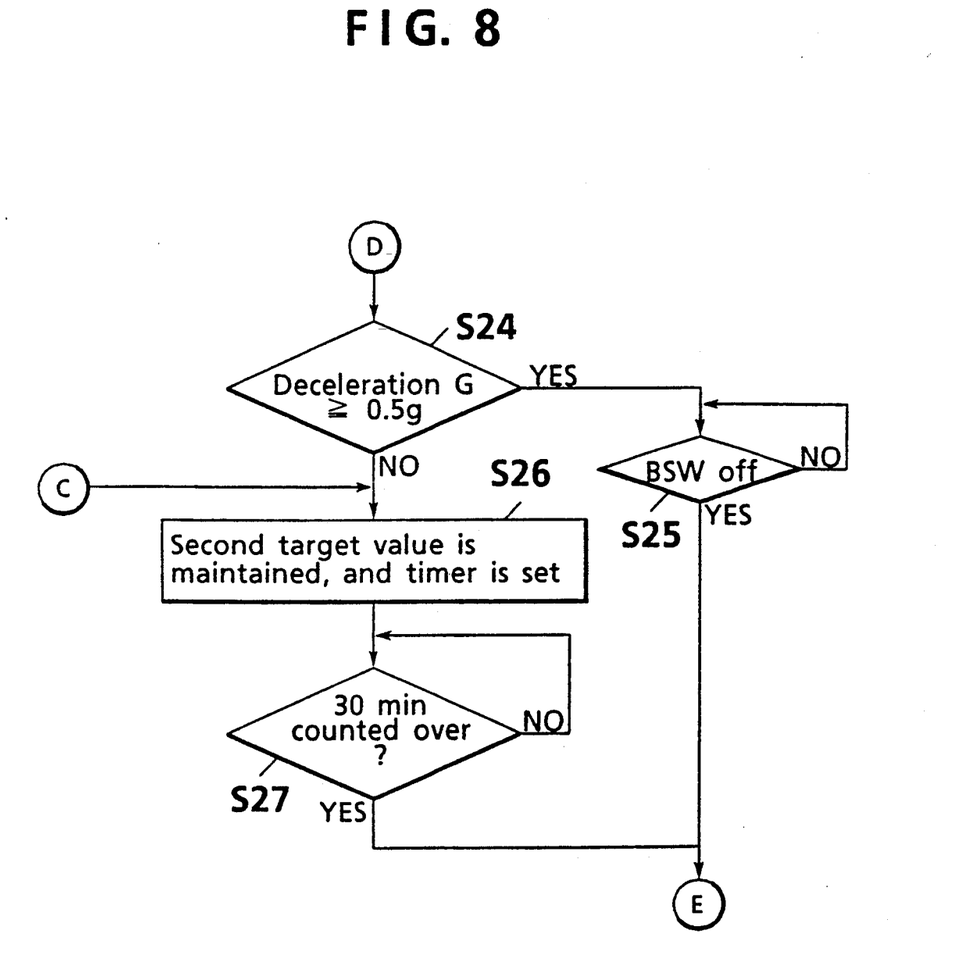

When the determination result of step S22 is YES, determination is made as to whether or not the above-described third target value is set in the memories m1 and m2 (step S23). When the determination result of step S23 is NO, that is, when it is determined that the second target value is set, the processing in step S24 and after in FIG. 8 is performed.

First, determination is made in step S24 as to whether or not a longitudinal G, that is, a braking deceleration detected by the G sensor 39 during braking is 0.5 g or more. When the determination result in step S24 is YES, that is, when a high braking of 0.5 g can be generated during braking, it is determined that the target value set in the memories m1 and m2 is low. Then, determination is made in step S25 as to whether or not a brake switch (BSW) 40 is off. When the result is YES, that is, when the brake pedal is returned, processing is returned to step S21 where the first target value P1 is set to the memories m1 and m2.

That is, generation of a high braking deceleration of 0.5 g or more is determined that the vehicle is traveling on a road with a high frictional coefficient μ, the target value of split point pressure is increased in the range where the rear wheels do not lock to increase the braking force of the rear wheels.

When the determination result in step S24 is NO, with the second target value maintained in the memories m1 and m2, the timer is set (step S26). When the timer counts over 30 minutes, the processing is returned to step S21 where the first target value P1 is set to the memories m1 and m2 (step S27).

Thus, with the second target value set in the memories m1 and m2, when a high braking deceleration of 0.5 g or more is generated before the timer 1 counts over a predetermined time, the contents of the memories m1 and m2 are reverted back to the first target value P1 immediately when the brake pedal is returned. However, when a high braking deceleration of 0.5 g or more is not generated, the contents are reverted back to the first target value after the second target value is maintained for 30 minutes. That is, since in the condition where the second target value is set as the target value (i.e. a maintaining signal is outputted from the ABS controller 36), the wheels are likely to lock if the driver brakes a little stronger, the second target value is maintained for 30 minutes.

When the determination result in step S23 is YES, determination is made as to whether or not the fourth target value is set in the memories m1 and m2 (step S28). When the determination result in step S28 is NO, that is, when it is determined that the third target value is set in the memories m1 and m2, the processing goes to step S29 in FIG. 9.

Figure 9:
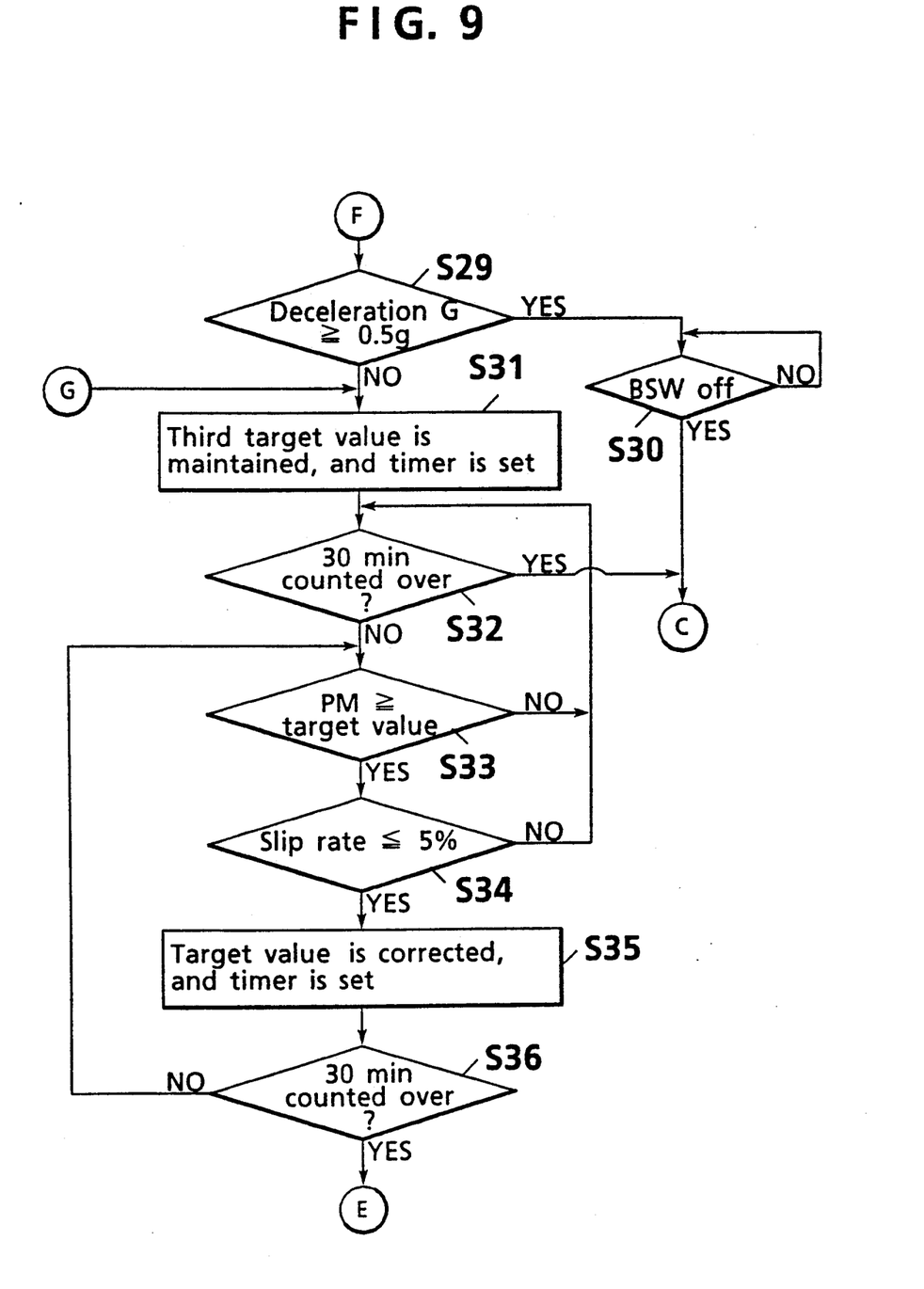

First, determination is made in step S29 as to whether or not the longitudinal G, that is, the braking deceleration, detected by the G sensor 39 during braking is 0.5 g or more. When the determination result in step S29 is YES, that is, when a high braking of 0.5 g can be generated during braking, it is determined that the target value set in the memories m1 and m2 is low. Then, in step S30, determination is made as to whether or not the brake switch (BSW) 40 is off, when the result is YES, that is, when the brake pedal is returned, the processing is returned to step S26.

When the determination result in step S29 is NO, with the third target value maintained in the memories m1 and m2, the timer is set (step S31). Then, determination is made as to whether or not the timer counts over 30 minutes (step S32). When the determination result in step S32 is YES, that is, the timer counts over 30 minutes, the processing in step S26 is performed.

That is, even with the third target value set in the memories m1 and 2, generation of a high braking deceleration of 0.5 g or more is determined that the vehicle is traveling on a road with a high frictional coefficient $\mu$, the target value of split point pressure is increased in the range where the rear wheels do not lock to increase the braking force of the rear wheels.

When the determination result in step S32 is NO, that is, when it is determined that the timer set in step 31 does not count over 30 minutes, determination is made as to whether or not the master cylinder pressure PM detected by the pressure sensor 38 is equal to or higher than the third target value set in the memories m1 and m2 (step S33). When the determination result in step S33 is YES, determination is made as to whether or not the slip rate S inputted from the ABS controller 36 to the controller 37 is 5% or less (step S34).

When the determination result in step S34 is YES, that is, when only a small slip of less than 5% is generated even with the increased master cylinder pressure, it is determined that the vehicle is traveling on a road with a high frictional coefficient $\mu$ of the surface, and it is determined that the rear wheels will not lock even if the target value of split point pressure is increased to increase the rear wheel braking force. In such a case, a correction is made to increase the target value (step S35). That is, where Poo is a target value after correction, Po is a target value set in the memories m1 and m2, and PM is a master cylinder pressure at braking, $$Poo = Po + \alpha(PM - Po)$$

(wherein $\alpha$ is a setting constant).
Provided, however, that Poo is a value that does not exceed the first target value P1.

Then, the timer is set, and processing in step S33 and after is repeated until the timer counts over 30 minutes. When it is determined in step S36 that the timer counts over 30 minutes, the processing is returned to step S21 where the first target value is set in the memories m1 and m2.

When the determination result in step S33 is NO, the processing returns to step S32.

When the determination result in step S28 is YES, the processing transfers to step S37 and after. First, with the fourth target value maintained in the memories m1 and m2, the timer is set (step S37). Then, determination is made as to whether or not the timer counts over 30 minutes (step S38). When the determination result in step S38 is YES, that is, when it is determined that the timer counts over 30 minutes, the processing in step S31 is performed.

When the determination result in step S38 is NO, that is, it is determined that the timer set in step S37 does not count over 30 minutes, determination is made as to whether or not the master cylinder pressure PM detected by the pressure sensor 38 is equal to or higher than the target value set in the memories m1 and m2 (step S39). When the determination result in step S39 is YES, determination is made as to whether or not the slip rate S inputted from the ABS controller 36 to the controller 37 is 5% or less (step S40).

When the determination result in step S40 is YES, that is, when only a small slip of less than 5% is generated even with the increased master cylinder pressure, it is determined that the vehicle is traveling on a road with a high frictional coefficient $\mu$ of the surface, and it is determined that the rear wheels will not lock even if the target value of split point pressure is increased to increase the rear wheel braking force. In such a case, a correction is made to increase the target value (step S41). That is, where Poo is a target value after correction, Po is a target value set in the memories m1 and m2, and PM is a master cylinder pressure at braking, $$Poo = Po + \alpha(PM - Po)$$

(wherein $\alpha$ is a setting constant).
Provided, however, that Poo is a value that does not exceed the first target value P1.

Then, the timer is set, and the processing in step S39 and after is repeated until the timer counts over 30 minutes. When it is determined in step S42 that the timer counts over 30 minutes, determination is made as to whether or not the target value is the third target value or more (step S43). When the result is YES, since it is necessary to revert back to a target value greater than the third target value, that is, the second target value, the processing is returned to step S26, when the result is NO, the processing is returned to step S31 where the third target value is set.

When the determination result in stepS S39 and S40, the processing is returned to step S38.

As described above, when a high brake of 0.5 g or more is generated after the second target value or the third target value is once set, it is determined that the target value is set low, and the target value is increased to achieve an appropriate control over the rear wheel braking force allocation.

In the above-described embodiment, the split point pressure is adjusted according to the ABS signals a1 to a4 outputted from the ABS controller 36. However, alternatively, a slip rate of each wheel calculated by the ABS controller 36 may be inputted, and the ABS operation may be determined from the fact that the slip rate exceeds a predetermined value in place of the processing in step S2 to perform the same processing.

Furthermore, the G sensor 39 may be used as braking degree detection means in place of the pressure sensor 38 used in the above embodiment. In this case, a vehicle body deceleration GS detected by the G sensor 39 and target decelerations GL, G1, G2, G3, and G4 set in the controller 37 may individually be applied in place of the master cylinder pressure PM and the target pressures PL, P1, P2, P3, and P4 in the above embodiment, when the vehicle body deceleration reaches the target deceleration, and the PCV bypass valves 26 and 27 are closed to effect operation of the proportion valves 182 and 181, thereby ontaining substantially the same effect of the above embodiment.

Furthermore, the processing shown in FIGS. 6 to 9 may be omitted, and normally-close valves may be used as the PCV bypass valves 26 and 27 so that the valves are opened simultaneously with the operation of the brake switch 40, and the valves are opened when the target braking condition is reached.

Furthermore, the target value (setting value) which is set before the rear wheel antiskid brake system operates may be variably set according to the traveling environment, the rear wheel load, or the like.

We claim:

1. A rear wheel braking force control apparatus of a vehicle comprising:
proportioning valves disposed in passages for supplying a hydraulic pressure generated by a master cylinder to wheel cylinders of rear wheels for controlling wheel cylinder pressure so that increasing rate of the wheel cylinder pressure is smaller than increasing rate of master cylinder pressure;
electromagnetic valves disposed in the passages to affect or invalidate the action of said proportioning valves;
a rear wheel antiskid brake system for preventing locking of the rear wheels;
braking degree detection means for detecting a braking degree during braking of the vehicle; and
control means for operating said electromagnetic valves to invalidate the action of said proportioning valves when the braking degree detected by said braking degree detection means is weaker than a setting value, operating said electromagnetic valves to effect the action of said proportioning valves when the braking degree is stronger than the setting degree, and correcting the setting value to a lower value when operation of said rear wheel antiskid brake system is detected.

2. The apparatus of claim 1 further comprising a front wheel antiskid brake system, and wherein said control means suppresses the setting value to a lower value when said rear wheel antiskid brake system operates earlier than said front wheel antiskid brake system.

3. The apparatus of claim 1 wherein the braking degree detected by said braking degree detection means when said rear wheel antiskid brake system operates is set as the setting value.

4. The apparatus of claim 3 wherein, after the braking degree detected when said rear wheel antiskid brake system outputs a maintaining signal to the rear wheels, said control means corrects the setting value to an even lower value when a pressure reduction signal is outputted to the rear wheels.

5. The apparatus of claim 1 further comprising a front wheel antiskid brake system, and wherein said control means, after correcting the setting value to a lower value in association with operation of said rear wheel antiskid brake system, sets the setting value to a variable least value when it is detected that said rear wheel antiskid brake system operates earlier than said front wheel antiskid brake system.

6. The apparatus of claim 1 wherein said control means sets an initial value of the setting value to a settable largest value.

7. The apparatus of claim 1 wherein said control means limits duration of the setting value corrected to a lower value to a predetermined time, and increases the setting value after the lapse of the predetermined time.

8. The apparatus of claim 7 further comprising vehicle speed detection means, and wherein said control means operates a timer for counting the predetermined time only when the vehicle is determined to be in a traveling condition from a detected vehicle speed.

9. The apparatus of claim 1 wherein said control means maintains a target braking degree set at that time for a predetermined time when said control means detects an OFF operation of an ignition switch.

10. The apparatus of claim 1 further comprising deceleration detection means, and wherein said control means, after correcting the setting value to a lower value, increases the setting value when a deceleration during braking is detected to be greater than a predetermined value.

11. The apparatus of claim 10 wherein said control means performs the increasing correction after the completion of braking.

12. The apparatus of claim 1 wherein said control means, after correcting the setting value to a lower value, increases the setting value when said control means detects that the braking degree detected by said braking degree detection means is the setting value or greater and a slip rate of the rear wheels is smaller than a predetermined value.

13. The apparatus of claim 12 wherein said control means maintains the increased target braking degree for a predetermined time.

14. The apparatus of claim 1 wherein said rear wheel antiskid brake system, said proportioning valves and said electromagnetic valves are provided for right and left rear wheels, and said control means corrects the setting value for the right rear wheel and the left rear wheel independent of each other according to operation condition of the corresponding rear wheel antiskid brake system.

15. The apparatus of claim 1 wherein said braking degree detection means detects the master cylinder pressure, and said control means uses a target pressure as the setting value and controls said electromagnetic valves in comparison of the detected master cylinder pressure with the target pressure.

16. The apparatus of claim 15 wherein said braking degree detection means detects a hydraulic pressure in a passage between said master cylinder and said proportioning valves.

17. The apparatus of claim 1 wherein said braking degree detection means detects a deceleration generated on the vehicle body, said control means uses a target deceleration as the setting value and controls said electromagnetic valves in comparison of the detected deceleration with the target deceleration.

18. The apparatus of claim 1 wherein said electromagnetic valves are ON/OFF valves disposed in passages for bypassing said proportioning valves and transmitting the master cylinder pressure to said wheel cylinders.

19. A rear wheel braking force control method for a vehicle for controlling operation of electromagnetic valves disposed in passages for supplying a hydraulic pressure generated by a master cylinder to wheel cylinders of rear wheels to affect or invalidate operation of proportioning valves for controlling wheel cylinder pressures so that increasing rate of wheel cylinder pressure is smaller than increasing rate of master cylinder pressure, comprising:
 a step for detecting a braking degree during braking of the vehicle;
 a step for operating said electromagnetic valves to invalidate the action of said proportioning valves when the detected braking degree is weaker than a setting value, and operating said electromagnetic valves to effect the action of said proportioning valves when the braking degree is stronger than the setting degree;
 a step for detecting operation of a rear wheel antiskid brake system; and
 a step for correcting the setting value to a lower value when operation of said rear wheel antiskid brake system is detected.

20. The method of claim 19 wherein said step for correcting the setting value to a lower value corrects the setting value when said rear wheel antiskid brake system operates earlier than a front wheel antiskid brake system.

21. The method of claim 19 wherein said step for correcting the setting value to a lower value sets a braking degree detected when said rear wheel antiskid brake system operates as the setting value.

22. The method of claim 19 wherein said step for correcting the setting value to a lower value comprises a step for setting a braking degree detected at the time said rear wheel antiskid brake system outputs a maintaining signal as the setting value, and a step for correcting the setting value to an even lower value when a pressure reduction signal is outputted to the rear wheels thereafter.

23. The method of claim 19 wherein said step for correcting the setting value to a lower value comprises a step for correcting the setting value to a lower value in association with operation of said rear wheel antiskid brake system, and a step for setting the setting value to a variable least value when it is detected that said rear wheel antiskid brake system operates earlier than a front wheel antiskid brake system thereafter.

24. The method of claim 19 further comprising a step for setting an initial value of the setting value to a settable largest value.

25. The method of claim 19 further comprising a step for limiting duration of the setting value corrected to a lower value to a predetermined time and increasing the setting value after the lapse of the predetermined time.

26. The method of claim 25 further comprising a step for detecting vehicle speed detection means, and wherein said step for increasing the setting value performs counting operation of a timer for the predetermined time only when the vehicle is determined to be in a traveling condition from a detected vehicle speed.

27. The method of claim 19 further comprising a step for maintaining a target braking degree set at that time for a predetermined time when an OFF operation of an ignition switch is detected.

28. The method of claim 19 further comprising a step for detecting a deceleration generated on the vehicle body, and a step for increasing the setting value when a deceleration during braking is detected to be greater than a predetermined value after the setting value is corrected to a lower value.

29. The method of claim 28 wherein said step for increasing the setting value performs the increasing correction after the completion of braking.

30. The method of claim 19 further comprising a step for detecting a slip rate of the rear wheels, and a step for increasing the setting value when it is detected that the braking degree detected by said braking degree detection means is the setting value or greater and a slip rate of the rear wheels is smaller than a predetermined value after the setting value is corrected to a lower value.

31. The method of claim 30 wherein said step for increasing the setting value maintains the increased target braking degree for a predetermined time.

32. The method of claim 19 wherein said rear wheel antiskid brake system, said proportioning valves, and said electromagnetic valves are provided for the individual right and left rear wheels, and said step for controlling operation of said electromagnetic valves controls said right and left rear wheels independent of each other, and said step for correcting the setting value to a lower value corrects the setting value for the right rear wheel and the left rear wheel independent of each other according to operation condition of the corresponding rear wheel antiskid brake system.

33. The method of claim 19 wherein said step for detecting the braking degree detects the master cylinder pressure, and said step for controlling operation of said electromagnetic valves uses a target pressure as the setting value and controls said electromagnetic valves in comparison of the detected master cylinder pressure with the target pressure.

34. The method of claim 33 wherein said step for detecting the braking degree detects a hydraulic pressure in a passage between said master cylinder and said proportioning valves 35. The method of claim 34 wherein said step for detecting the braking degree detects a deceleration generated on the vehicle body, and said step for controlling operation of said electromagnetic valves uses a target deceleration as the setting value and controls said electromagnetic valves in comparison of the detected deceleration with the target deceleration.

36. The method of claim 19 wherein said step for controlling operation of said electromagnetic valves controls the operation of said electromagnetic valves using an ON/OFF valve disposed in a passage for bypassing said proportioning valves and transmitting the master cylinder pressure to said wheel cylinders.

* * * * *